United States Patent [19]

Yankoff

[11] Patent Number: 4,651,972
[45] Date of Patent: Mar. 24, 1987

[54] ROTARY FLOW CONTROL APPARATUS

[76] Inventor: Gerald K. Yankoff, 8273 Coppernail Way, Westchester, Ohio 45069

[21] Appl. No.: 773,171

[22] Filed: Sep. 6, 1985

[51] Int. Cl.$^4$ ............................................. F16K 11/06
[52] U.S. Cl. ..................................... 251/163; 251/175; 137/625.47; 137/624.27
[58] Field of Search ............... 251/175, 159, 163, 172; 137/625.11, 625.47, 624.27, 624.15

[56] References Cited

U.S. PATENT DOCUMENTS

| | | | |
|---|---|---|---|
| 2,593,733 | 4/1952 | Davies | 137/625.11 |
| 2,781,056 | 2/1957 | Carufel | 137/625.47 X |
| 2,972,357 | 2/1961 | Ford | 137/625.11 |
| 3,765,645 | 10/1973 | Paul | 251/159 X |
| 3,863,675 | 2/1975 | Wiltshire | 137/624.27 |
| 4,083,376 | 4/1978 | Alaniz | 251/172 X |

FOREIGN PATENT DOCUMENTS 653209 11/1962 Canada ........................... 137/625.11

Primary Examiner—Alan Cohan
Attorney, Agent, or Firm—Wood, Herron & Evans

[57] ABSTRACT

A flow control apparatus for selectively directing fluid from a fluid supply line to a number of outlet lines includes an outer member having an outer wall, a throughbore forming an annular inner wall and a plurality of spaced, discharge bores formed therebetween. An inner member having an annular outer wall is received within the throughbore of the outer member so that their annular walls face one another. The outer member is rotatable with respect to the inner member to selectively align each of its discharge bores with the fluid passageway of the inner member, and an interlock mechanism is provided to ensure accurate alignment therebetween. The facing surfaces of the inner and outer members are sealed at the fluid passageway by a Teflon seal mounted at one end of a driven piston which is axially movable within the fluid passageway. A second, driver piston is operable to force the driven piston axially toward the outer member so that the Teflon seal is compressed between the facing surfaces of the inner and outer members to prevent fluid leakage at the fluid passageway and an aligning discharge bore.

10 Claims, 3 Drawing Figures

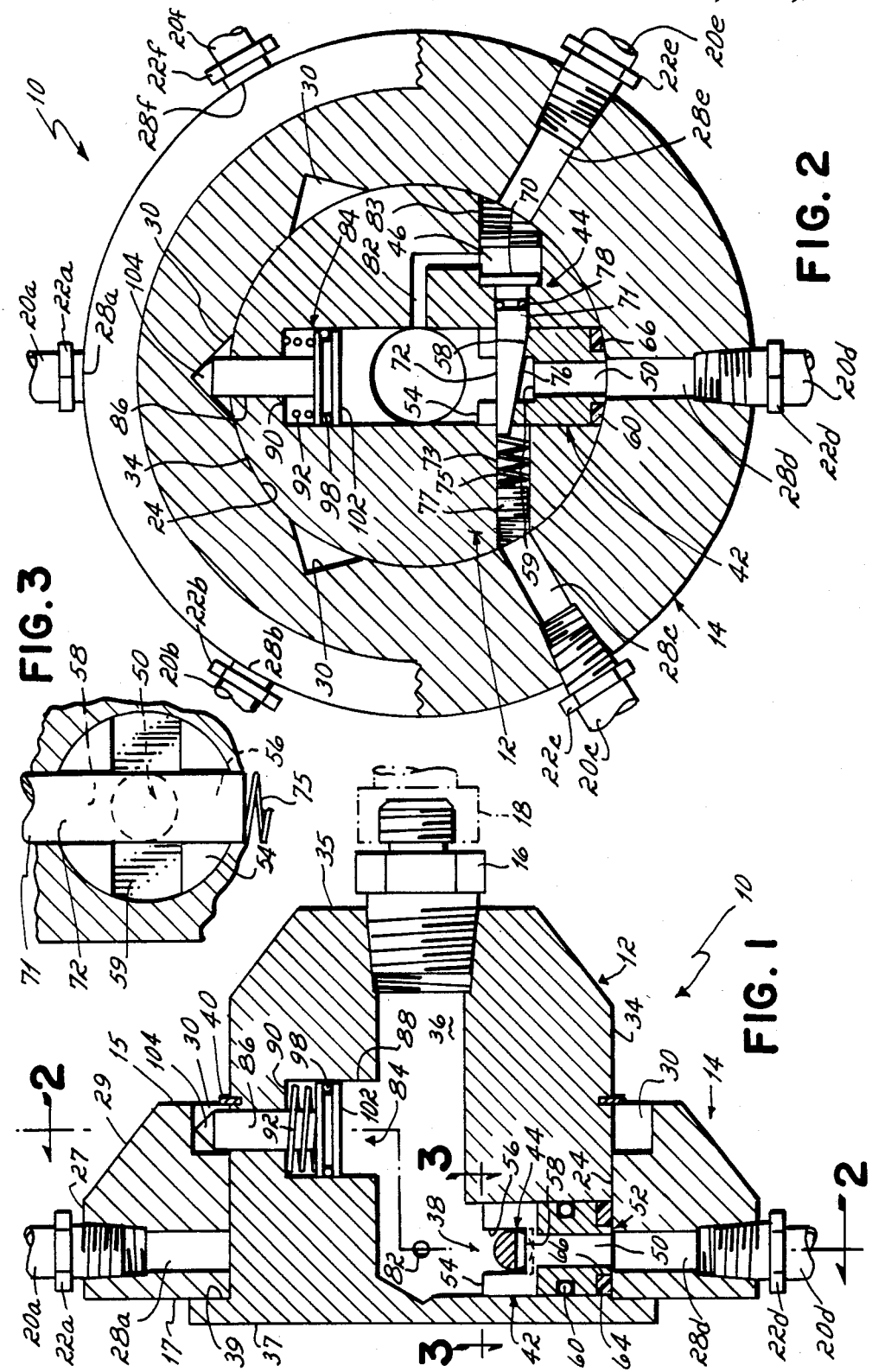

ROTARY FLOW CONTROL APPARATUS

BACKGROUND OF THE INVENTION

This invention relates to flow control devices, and, more particularly, to a rotary flow control apparatus for selectively directing fluid flow from a single inlet line to a plurality of outlet lines.

Many applications require the distribution of operating fluids from a single source to a number of fluid operated devices such as hydraulic or pneumatic cylinders. Usually, fluid is supplied to a number of branch lines by a single supply line connected to a pump. One requirement of such fluid delivery systems is the provision of efficient, economical controller devices for selectively controlling the flow of fluid from the supply line to each of the branch lines.

One method of fluid control proposed in the prior art has been to incorporate solenoid-operated valves in each of the branch lines which are opened and closed by electronic or fluid operated controllers. In sophisticated systems, the controllers are often operated by computer to ensure that fluid is supplied to selected branch lines at appropriate times.

These systems are effective in the distribution of fluid through selected branch lines, but several problems are created. In many applications, the solenoid-operated valves and controller devices are too bulky and do not fit available space requirements. All of the pipe fittings connecting the supply line to the branch lines, and the branch lines to the fluid morotrs or other fluid-operated devices, are subject to leakage and/or failure. In addition, the control systems and solenoid-operated valves are relatively expensive to purchase and their overall complexity makes repairs costly.

SUMMARY OF THE INVENTION

It is therefore among the ojbects of this invention to provide a rotary flow control apparatus for directing fluid flow from a source or main fluid supply line to a plurality of outlet lines which is compact, which requires no special mounting structure, which is operable without leakage over a wide range of fluid pressures, which does not require close tolerances to be maintained between its movable parts, which is relatively inexpensive to manufacture and maintain and which includes a seal resistant to wear and contact by foreign particles.

These and other objects are accomplished in a rotary flow control apparatus according to this invention including an inner member having an annular outer wall and at least one fluid passageway which terminates at the annular outer wall and communicates with a fluid supply line. An outer member is formed with an outer wall and a throughbore which defines an inner annular wall. A plurality of discharge bores are formed between the inner and outer walls of the outer member which are adapted to be connected to fluid outlet lines. The inner member is received within the throughbore of the outer member so that its annular outer wall faces the annular inner wall of the outer member to permit relative rotation therebetween. In a presently preferred embodiment of this invention, the outer member is rotatable to align selected discharge bores with the fluid passgeway in the inner member. This forms a path for movement of the fluid from the fluid supply line, through the fluid passageway in the inner member and out the discharge bores in the outer member to the fluid outlet lines.

In accordance with one aspect of this invention, a fluid-tight seal is created between the fluid passageway and each of the discharge bores to prevent leakage between the facing annular walls of the inner and outer member thereat. This seal is formed by a driver-driven piston pair which force a "Teflon" seal into the gap between the facing annular walls of the inner and outer members at the fluid passageway and an aligning discharge port. ("Teflon" is a registered trademark of E. I. duPont deNemours Company).

The driven piston is axially movable within the fluid passageway formed in the inner member and includes a central throughbore, a forward end terminating at the outer annular wall of the inner member, and a rearward end having a wedge-shaped notch formed with an angled bearing surface and an intersecting, transverse notch which communicates with the central throughbore. Mounted to the forward end of the driven piston is the Teflon seal which is formed substantially flush with the outer wall of the inner member. The driven piston is movable axially within the fluid passageway so that its Teflon seal engages the inner annular wall of the outer member to create a seal between the fluid passageway and an aligning discharge bore.

The driver piston is axially movable within a transverse bore having a rearward end, and a forward end connected to the fluid passageway in which the driven piston is provided. The rearward end of the transverse bore communicates through a secondary fluid passageway with the fluid supply line. The driver piston is formed with an angled, forward bearing surface which mates with the angled bearing surface formed by the wedge-shaped notch at the rearward end of the driven piston. The angle between the mating bearing surfaces of the driver and driven pistons is such that axial movement of the driver piston within its transverse bore forces the driven piston axially within the fluid passageway so that its Teflon seal contacts the inner annular wall of the outer member.

In operation, fluid under pressure from the fluid supply line enters the fluid passageway, and also enters the transverse bore through the secondary passageway, at the same time. The fluid flowing into the fluid passageway enters the throughbore of the driven piston through the transverse notch at its rearward end, and is directed toward the aligning discharge bore in the outer member. Simultaneously, the fluid entering the transverse bore engages the rearward surface of the driver piston forcing it axially within the transverse bore towrad the rearward end of the driven piston. Contact of the angled bearing surface of the driver piston with the mating, angled bearing surface of the driven piston moves the driven piston axially so that its Teflon seal engages the inner surface of the outer member creating a seal thereat.

A mechanical advantage is obtained between the driver and driven pistons because the angled bearing surface of the driver piston acts like a wedge against the mating bearing surface of the driven piston. The force applied by the driver piston against the driven piston therefore exceeds the force applied to the driven piston in the opposite direction. The force in the opposite direction acting against the forward end of the driven piston is caused by the fluid flowing through its throughbore which does not enter the aligning discharge bore due to tolerances between the inner and outer members but instead impacts against the inner wall of the outer member in the area of the aligning discharge bore. The mechanical advantage obtained between the driver-driven pistons ensures that an effective seal is maintained between the inner and outer members over a wide range of line pressures. The pistons are returned to their original positions when the fluid flow from the source is terminated.

A locking mechanism is provided in accordance with another aspect of this invention to ensure proper alignment of the fluid passageway of the inner member with a selected discharge bore in the outer member. The outer member is formed with a plurality of spaced recesses disposed in the same horizontal plane as a retractable pin movable within a guide bore formed in the inner member. The guide bore is connected to the fluid supply line so that the pin is moved axially, towrad the outer member, upon initiation of the fluid flow.

When the outer member is indexed so as to align one of its discharge bores with the fluid passageway of the inner member, one of the recesses in the outer member is positioned in alignment with the pin. The pin is forced outwardly into the recess in the outer member when the fluid flow begins so as to lock the rotatable outer member in a fixed position with respect to the fixed inner member. A spring mounted within the guide bore returns the pin to its original position when the fluid flow is terminated.

The rotary flow control apparatus of this invention provides a relatively inexpensive means of directing fluid flow from a single source or fluid inlet line to selected outlet lines. A positive seal is created between the fixed inner member and the rotatable, outer member regardless of the fluid pressure in the fluid supply line. This is because the Teflon seal of the driven piston is pressed against the outer member with a force greater than the force applied in the opposite direction to the driven piston by the fluid passing through its throughbore which does not enter the aligning discharge bore but escapes and engages the inner wall of the outer member in the area surrounding the aligning discharge bore. The Teflon seal is highly wear resistant, and is capable of deforming to a substantial extent under high pressure without failure. In addition, the Teflon seal is press fitted to the forward end of the driven piston so that dirt will not become lodged therebetween.

The flow control apparatus of this invention may be mounted in place by a rigid fluid supply line. No specially mounting structure is required for any application. This allows the apparatus herein to be readily adapted for use in a variety of applications at minimal cost. In addition, the outer member may be indexed relative to the inner member by a turret or other rotatable mechanism with which the flow control apparatus of this invention is utilized.

DESCRIPTION OF THE DRAWINGS

The structure, operation and advantages of a presently preferred embodiment of this invention will become further apparent upon consideration of the following description taken in conjunction with the accompanying drawings, wherein:

FIG. 1 is a side elevational view of the flow control apparatus herein; and

FIG. 2 is a partial cross sectional view taken generally along line 2—2 of FIG. 1; and FIG. 3 is a partial cross sectional view of the rear portion of the driven piston taken generally along line 3—3 of FIG. 1.

DETAILED DESCRIPITON OF THE INVENTION

Referring now to the drawings, the rotary flow control apparatus 10 according to this invention includes an inner member 12 received disposed within a throughbore formed in a rotatable outer member 14. The inner member 12 is connected by a fitting 16 to a rigid fluid supply line or pipe 18 which mounts the apparatus 10 in place. A number of outlet lines 20a-f are each connected by fittings 22a-f, respectively, to the outer member 14. The apparatus 10 functions to direct fluid, under pressure, from the fluid supply pipe 18 through the inner member 12 and into selected outlet lines 20a-f in the outer member 14.

The outer member 14 is essentially donutshaped having a top surface 15, a bottom surface 17, and a throughbore forming an annular inner wall 24. The outer wall of outer member 14 includes a bottom sidewall 27 and an upper, tapered sidewall 29. Six spaced discharge bores 28a-f are formed at approximately equal intervals in the same horizontal plane in the bottom sidewall 27 of the outer member 14, between its inner and outer walls 24, 26. The discharge bores 28a-f each receive a fitting 22a-f, respectively, for mounting the outlet lines 20a-f. The outer member 14 is also formed with six substantially V-shaped recesses 30, each of which aligns with one of the outlet lines 20a-f. The recesses 30 are disposed in a horizontal plane passing through the tapered sidewall 29 of outer member 14, which is parrallel to and spaced above the plane passing through the discharge bores 28a-f, for purposes to become apparent below.

The inner member 12 is formed with an outer annular wall 34, a top end 35 and a bottom end 37 having an annular flange 39 extending radially outwardly from the outer wall 34. The inner member 12 is disposed within the central bore of the outer member 14 such that at least a portion of the outer annular wall 34 of the inner member 12 is received within and faces the inner annular wall 24 of the outer member 14. The inner member 12 is formed with a central bore 36 connected to the fluid supply pipe 18 by the fitting 16, and a fluid passageway 38 extending between the bottom portion of the central bore 36 and the outer annular wall 34. The central bore 36 and fluid pasageway 38 provide a path for delivery of fluid, under pressure, from the fluid supply pipe 18 to the discharge bores 28a-f of the outer member 14.

The inner member 12 is mounted in a fixed position by the rigid fluid supply pipe 18 to support the entire flow control apparatus 10. It is contemplated, however, that other suitable mounting arrangements could be employed to secure the inner member 12 in a fixed position. The bottom surface 17 of outer member 14 is slidably mounted atop the annular flange 39 of the fixed inner member 12 by a retaining ring 40 which seats within a notch formed in the outer wall 34 of the inner member 12 and extends radially outwardly over the top surface 15 of the outer member 14. The outer member 14 is rotatable with respect to the fixed inner member 12 so as to align selected discharge bores 28a-f with the fluid passageway 38. In order to allow for rotation of the outer member 14 relative the inner member 12, a tolerance in the range of approximately 0.005 to 0.030 inch is maintained between their facing walls 34, 24, respectively.

The space or gap between the facing annular walls 34, 24 of the inner member 12 and outer member 14 must be sealed fluid-tight to prevent leakage of the pressurized fluid flowing between the fluid passageway 38 and one of the discharge bores 28a–f. The sealing means according to this invention includes a driven piston 42 axially movable within the fluid passageway 38, and a driver piston 44 which is axially movable within a transverse bore 46 formed in the inner member 12 perpendicular to and communicating with the rearward portion of the fluid passageway 38. As used to describe the driven piston 42, "forward" refers to the end of the driven piston 42 at the outer wall 34 of inner member 12 and "rearward" refers to the end closest to the central bore 36. The "forward" end of driver piston 44 refers to the end nearest the driven piston 42, and the "rearward" end refers to the opposite end.

The driven piston 42 is formed with a central throughbore 50 and a forward end 52 which terminates near the outer annular wall 34 of inner member 12. The rearward end 54 of the driven piston 42 is formed with wedge-shaped notch 56 which defines an angled bearing surface 58 disposed at an angle of approximately 20° with respect to an axis perpendicular to the longitudinal axis of the driven piston 42. A transverse notch 59 is also formed in the rearward end 54 of driven piston 42, perpendicular to horizontal notch 56, which communicates with the central throughbore 50. See FIG. 3. An O-ring 60 is mounted in a groove formed in the exterior surface of the driven piston 42 to seal it within the fluid passageway 38.

In a presently preferred embodiment of this invention, the forward end 52 of driven piston 42 is provided with a sealing member in the form of a Teflon seal 64 ("Teflon" is a registered trademark of E. I. duPont de Nemours Company for tetrafluoroethylene fluorocarbon polymers). The Teflon used to form the Teflon seal 64 is standard bearing grade having a compressive strength of 10,000 psi, which is readily commercially available. The Teflon seal 64 is formed in the shape of a ring and press-fitted onto an annular shoulder or seat 66 formed at the forward end 52 of the driven piston 42. Preferably, in the non-operating position of apparatus 10, the Teflon seal 64 is substantially flush with the outer annular wall 34 of the inner member 12.

The driver piston 44 is a solid cylindrical-shaped member having a rearward end 70, an intermediate section 71 and a cylindrical-shaped forward end 72 a portion of which is tapered to form a bearing surface 76. The forward end 72 of the driver piston 44 extends into the fluid passageway 38 so that its bearing surface 76 mates with the bearing surface 58 formed in the rearward end 54 of driven piston 42. See FIG. 2. The forward end 72 extends through the fluid passageway 38 and into a bore 73 formed in the inner member 12 which guides the movement of driver piston 44 as described in more detail below. A spring 75 engages the forward end 72 within the bore 73 to urge the driver piston 44 rearwardly, for purposes to become apparent below. A plug 77 is mounted within the bore 73 and biases the spring 75 toward the forward end 72 of driver piston 44.

Preferably, the diameter of the rearward end 70 of the driver piston 44 is about three times greater than the diamter of the intermediate section 71. In addition, the angled, bearing surface 76 formed in the forward end 72 of driver piston 44 is disposed at approximately a 20° angle with respect to the longitudinal axis of the driver piston 44.

The driver piston 44 is axially movable within the transverse bore 46 and sealed therein by an O-ring 78 mounted in a groove formed in the intermediate section 71. A secondary fluid passageway 82 connects the transverse bore 46 with the central bore 36 to provide a path for the delivery of fluid, under pressure, into the transverse bore 46 to the rearward end 70 of driver piston 44. A plug 83 is mounted in the rearward end of transverse bore 46 to seal it fluid-tight.

A seal is created between the inner member 12 and outer member 14 as follows. The outer member 14 is positioned with respect to the inner member 12 such that one of the discharge bores 28a–f aligns with the fluid passageway 38. Pressurized fluid is then directed through the fluid supply pipe 18 into the central bore 36 of the inner member 12. The fluid simultaneously flows into the fluid passageway 38 and through the secondary passageway 82 to the transverse bore 46.

In the position of outer member 14 illustrated in the Figs., fluid enters the throughbore 50 and transverse notch 59 in the driven piston 42 and is directed therethrough to the aligning outlet bore 28d. At the same time, the fluid flows into the transverse bore 46 between the rearward end 70 of the driver piston 44 and the plug 83. The line pressure of the fluid applies a force to the rearward end 70 of the driver piston 44 urging it axially within the transverse bore 46 and the bore 73. The bearing surface 76 of the forward end 72 of the driver piston 44 therefore exerts a force against the angled bearing surface 58 of driven piston 42 which drives the driven piston 42 axially forwardly, toward the outer member 14.

The driven piston 42 is thrust outwardly from fluid passageway 38 such that its Teflon seal 64 engages the inner annular wall 24 of the outer member 14 around the aligning discharge bore 28d. Under the force imposed by the driver piston 44, the Teflon seal 64 deforms to some extent between the outer annular wall 34 of inner plate 12 and inner annular wall 24 of outer ring 14 creating a fluid-tight seal at the fluid passageway 38 and aligning discharge bore 28d. The Teflon seal 64 is capable of undergoing a heavy load and some degree of deformation without failure. In order to allow the driven piston 42 to return to its original position after the fluid flow is stopped, the spring 75 is provided to force the driver piston 44 rearwardly within the transverse bore 46 to its original position.

The sealing force created between the inner member 12 and outer member 14 is proportional to the pressure of the fluid stream flowing through the system. This is because the driver piston 44 is actuated by whatever line pressure is present within fluid supply pipe 18. In addition, the acute angle at which the bearing surfaces 58, 76 of the driven and driver pistons 42, 44 mate provides a mechanical advantage in moving the driven piston 42 axially forwardly within the fluid passageway 38. In effect, the bearing surface 76 of the forward end 72 of the driver piston 44 acts like a wedge against the mating bearing surface 58 to force the driven piston 42 forwardly. The mechanical advantage is such that the force exerted by the driver piston 44 and the driver piston 42 always exceeds the force exerted in the opposite direction by the fluid stream as it tends to leak along the inner annular wall 24 of the outer member 14 in the area of the fluid passageway 38 and an aligning outlet bore 28a–d due to tolerances between the inner and outer member 12, 14.

In addition, the diameter of the rearward end 70 is three times greater than the diameter of the intermediate section 71 to overcome any back pressure which is exerted against the driver piston 44 by the fluid entering the fluid passageway 38, tending to force the driver piston 44 rearwardly within its transverse bore 46. Accordingly, the sealing means of this invention creates an effective, fluid-tight seal between the inner member 12 and outer member 14 at virtually any line pressure from very low pressures to high pressures.

In order to avoid misalignment of the fluid passageway 38 and the discharge bores 28a–f during operation of the apparatus 10, a locking mechanism 84 is provided for locking the outer member 14 with respect to the inner member 12. The locking mechanism 84 comprises a pin 86 movable within a bore 88 formed in the inner member 12 between the central bore 36 and the outer annular wall 34. The bore 88 includes a shoulder 90 which receives a spring 92 mounted to the pin 86 for biasing the pin 86 inwardly, substantially flush with the outer annular wall 34. The rearward portion 94 of pin 86 is formed with a groove which receives an O-ring 98 for sealing the pin 86 with respect to the bore 88.

The pin 86 is insertable within a number of spaced recesses 30 formed near the top surface 15 of the outer member 14, only three of which are shown in the Figs. The bore 88 and recesses 30 are formed in the same horizontal plane, which is parallel to and spaced above the horizontal plane containing the discharge bores 28a–f. The recesses 30 are spaced along the outer member 14 such that the pin 86 aligns with one of the recesses 30 upon alignment of the fluid passageway 38 with one of the discharge bores 28a–f.

When fluid is introduced into the central bore 36, the pin 86 is forced toward the outer ring 14 by the fluid entering bore 88 and contacting its rearward end 102. The pin 86 enters one of the aligning recesses 30 which locks the outer member 14 in place relative to the inner member 12 with the fluid passageway 38 in alignment with discharge port 28d. As shown in the drawings, the forward end 104 of pin 86 is preferably conical, as are the recesses 30, to aid in the insertion of the pin 86 within the recesses 100. The pin 86 is withdrawn from the recesses 100 when the fluid flow is terminated by operation of the spring 92, which normally biases the pin 86 in a retracted position, within inner member 12.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof.

For example, only one pair of driven and driver pistons 42, 44 are illustrated in the drawings. It should be understood, however, that more than one driven-driver piston pair could be provided in the inner member 12 so that two or more fluid passageways 38 would be activated when fluid is introduced into the fluid supply pipe 18 for simultaneously supplying fluid to a number of discharge ports 28a–f. In addition, the number of discharge ports 28a–f in the outer member 14 was chosen merely for purposes of illustrating of the concept of this invention. It is contemplated that any number of discharge ports 28a–f could be provided depending upon the requirements of a particular application.

Therefore, it is intended that the invention not be limited to the particular embodiment disclosed as the best mode contemplated for carrying out this invention, but that the invention will include all embodiments falling within the scope of the appended claims.

What is claimed is:

1. Apparatus for selectively distributing pressurized fluid from a fluid supply line to a plurality of fluid outlet lines, comprising:
    an outer member having an outer wall, a throughbore forming an annular inner wall and a plurality of spaced discharge bores extending between said annular inner wall and said outer wall;
    an inner member having an annular outer wall, said inner member being formed with at least one first fluid passageway and at least one second fluid passageway, said first fluid passageway communicating with said fluid supply line and terminating at said annular outer wall, said second fluid passageway communicating with said fluid supply line and intersecting said first fluid passageway;
    said inner member being received within said throughbore of said outer member such that said annular inner wall of said outer member faces said annular outer wall of said inner member, one of said inner and outer members being rotatable with respect to the other for selectively aligning each of said discharge bores of said outer member with said fluid passageway of said inner member;
    a driven piston axially movable within said first fluid passageway, said driven piston being formed with a sealing member at the forward end and a bearing surface spaced from the forward end;
    driver means axially movable within said second fluid passageway, the pressurized fluid from said supply line entering said second fluid passageway and moving said driver means into engagement with said bearing surface of said driven piston to force said driven piston axially forwardly so that said sealing member engages said annular inner wall of said outer member to form a seal between said annular outer wall of said inner member and said annular inner wall of said outer member at said first fluid passageway and an aligning discharge bore.

2. The apparatus of claim 1 in which said driven piston includes a forward end terminating at said annular outer wall of said inner member, said sealing member being mounted to said forward end of said driven piston substantially flush with said annular outer wall of said inner member.

3. The apparatus of claim 2 in which said sealing member is an annular ring formed of a tetrafluoroethylene fluorocarbon polymer.

4. The apparatus of claim 1 in which said bearing surface of said driven piston is formed at an acute angle of about 20° relative to a plane perpendicular to the longitudinal axis of said driven piston.

5. The apparatus of claim 1 further including a tranvsverse bore formed in said inner member connected to said fluid passageway, and a secondary passageway connected to said transverse bore and communicating with the fluid supply line, said driver means comprising:
    a driver piston axially movable within said transverse bore, said driver piston having a rearward end, and a forward end formed with a bearing surface adapted to mate with said bearing surface in said driven piston;

said secondary passageway directing fluid into said transverse bore and against said rearward end of said driver cylinder, said driver cylinder being forced axially within said transverse bore so that said bearing surface thereof applies a force to said bearing surface of said driven piston to axially move said driven piston toward said outer member, said sealing member of said driven piston engaging said annular inner wall of said outer member to form a seal therebetween at said fluid passageway and an aligning discharge port.

6. The apparatus of claim 5 in which said bearing surface of said driver piston is formed at an acute angle in the range of about 20° relative to the longitudinal axis of said driver piston.

7. The apparatus of claim 5 in which said forward end of said driver piston is cylindrical in shape having a tapered surface forming said bearing surface of said driver piston.

8. The apparatus of claim 7 in which said driver piston further includes a rearward end and an intermediate portion connected between said forward end and said rearward end, said rearward end having a cross section about three times larger than the cross section of said intermediate portion.

9. The apparatus of claim 1 in which said driven piston includes a forward end, a rearward end and a central throughbore, said rearward end being formed with a wedge-shaped notch forming an angled, bearing surface and a transverse notch communicating with said central throughbore.

10. The apparatus of claim 1 further including locking means comprising:

a pin axially movable within a bore formed in said inner member, said bore communicating with said fluid supply line, said pin being formed with a forward end engageable with a plurality of spaced recesses formed in said outer member;

the pressurized fluid from said fluid supply line moving said pin axially forwardly so that said forward end of said pin enters one of said recesses in said outer member for locking said inner member in position with respect to said outer member; and a spring mounted to said pin, said spring urging said pin rearwardly in response to the absence of pressurized fluid within said fluid supply line so that said forward end of said pin disengages said recesses in said outer member to permit rotation of said inner member relative to said outer member.

* * * * *